United States Patent
Zanganeh et al.

(10) Patent No.: US 8,679,225 B2
(45) Date of Patent: Mar. 25, 2014

(54) HOT SIEVING ELECTROSTATIC PRECIPITATOR

(75) Inventors: Kourosh Zanganeh, Ottawa (CA); Zahirul Hasan Khan, Ottawa (CA); Carlos Salvador, Ottawa (CA); Jack Jensen, Ottawa (CA)

(73) Assignee: Her Majesty the Queen in right of Canada as represented by the Minister of Natural Resources, Ontario (CA)

(*) Notice: Subject to any disclaimer, the term of this patent is extended or adjusted under 35 U.S.C. 154(b) by 178 days.

(21) Appl. No.: 13/384,292

(22) PCT Filed: Jul. 16, 2010

(86) PCT No.: PCT/CA2010/001127
§ 371 (c)(1),
(2), (4) Date: Jan. 16, 2012

(87) PCT Pub. No.: WO2011/006262
PCT Pub. Date: Jan. 20, 2011

(65) Prior Publication Data
US 2012/0111188 A1 May 10, 2012

(30) Foreign Application Priority Data
Jul. 17, 2009 (CA) .................................. 2673053

(51) Int. Cl.
*B03C 3/76* (2006.01)
*B03C 3/80* (2006.01)

(52) U.S. Cl.
USPC ................ 95/3; 95/68; 95/74; 95/76; 96/19; 96/30; 96/31; 96/32; 96/43; 96/50

(58) Field of Classification Search
USPC .......... 95/3, 68, 74–76; 96/19, 30–38, 43, 50, 96/97
See application file for complete search history.

(56) References Cited

U.S. PATENT DOCUMENTS 3,958,962 A * 5/1976 Hayashi ............................ 96/97
3,973,932 A    8/1976 Alskog
(Continued)

FOREIGN PATENT DOCUMENTS

JP          6-238194 A  *  8/1994 ........................ 96/97
WO    WO 2008/109592 A1 *  9/2008 ................ B03C 3/34

OTHER PUBLICATIONS

Zahirul H. Khan, Technical Publication, "Bench- and Pilot-Testing of Sieving Electrostic Precipitator" (Jun. 2007).
(Continued)

*Primary Examiner* — Richard L Chiesa
(74) *Attorney, Agent, or Firm* — Flynn, Thiel, Boutell & Tanis, P.C.

(57) ABSTRACT

An electrostatic precipitator and a method of removal of particulates from gaseous flows. A plurality of screens, secured in sets within a central chamber in a housing, include at least one set of electrically chargeable first screens and at least one set of electrically grounded second screens. For each set of chargeable screens, all the screens of the set are provided with an identical electrical charge, either positive or negative, and the set is provided with a plurality of spikes directed at the oncoming gaseous flow. At least one screen cleaning unit selectively acts on the screens of each set. The precipitator can include a plurality of central chambers in a single housing or separate housings, and the chambers can be selectively activated or deactivated. The precipitator provides improved particulate removal from gaseous flows, including hot flows having temperatures up to at least 1200° C.

48 Claims, 7 Drawing Sheets

(56) References Cited

U.S. PATENT DOCUMENTS

| | | | |
|---|---|---|---|
| 4,097,252 A | 6/1978 | Kirchhoff et al. | |
| 4,734,105 A * | 3/1988 | Eliasson et al. | 95/62 |
| 5,456,741 A * | 10/1995 | Takahara et al. | 96/22 |
| 5,695,549 A | 12/1997 | Feldman et al. | |
| 5,733,360 A * | 3/1998 | Feldman et al. | 95/78 |
| 5,820,660 A * | 10/1998 | Ko | 96/30 |
| 6,375,714 B1 * | 4/2002 | Rump et al. | 95/3 |
| 6,451,091 B1 | 9/2002 | Avina | |
| 6,878,192 B2 | 4/2005 | Pasic | |
| 7,001,447 B1 * | 2/2006 | Altman et al. | 95/74 |
| 7,258,729 B1 | 8/2007 | Barsimanto et al. | |
| 7,582,144 B2 * | 9/2009 | Krigmont | 96/16 |
| 8,328,902 B2 * | 12/2012 | Boyden et al. | 95/5 |
| 2008/0047433 A1 * | 2/2008 | Ouyang et al. | 96/24 |
| 2008/0105120 A1 | 5/2008 | Berry et al. | |

OTHER PUBLICATIONS

Form PCT/ISA/220 dated Oct. 13, 2010 (1 page).

Form PCT/ISA/237 dated Oct. 13, 2010 (8 pages).

Form PCT/ISA/210 dated Oct. 13, 2010 (4 pages).

* cited by examiner

HOT SIEVING ELECTROSTATIC PRECIPITATOR

CROSS REFERENCE TO RELATED APPLICATION

This is the National Stage of International Application No. PCT/CA2010/001127, filed on Jul. 16, 2010.

FIELD OF THE INVENTION

This invention relates to the removal of particulate matter and other pollutants from gaseous flows by the process of electrostatic precipitation. More specifically, the invention relates to a method and apparatus for removal of particulate matter from a high temperature gaseous flow by a hot sieving electrostatic precipitator. The embodiments of the apparatus of the invention include various configurations for different atmospheric and pressurized combustion and gasification applications.

BACKGROUND OF THE INVENTION

The drive towards near-zero emissions fossil fuel technologies, to reduce environmental pollution, is opening up many new opportunities for research and development innovation and technology development in the area of particulate and emissions control. While conventional electrostatic precipitators have been found effective at removing particulates in relatively low temperature (less than 300° C.) flue gas streams, very little progress has been made on using electrostatic precipitators (ESPs) to remove particulates in hot (above 300° C.) gaseous streams, typically from fossil fuel combustion and gasification synthetic gas generation processes. Hot gas particulate clean up is one area which offers opportunities to significantly reduce both operating and capital cost in many solid and liquid fossil fired process configurations.

The need to reduce particulate concentrations is common to all coal-based fuels, many fossil liquid fuels and other energy conversion technologies. Such particulate concentrations generally include silica, sulphur and nitrogen-containing species, alkali metals, halogens and trace heavy metals. In a Brayton cycle, the removal of particles, alkali and salts from the flue gas is necessary to minimize the damage to the turbine components and eliminate, or reduce so far as possible, severe corrosion and erosion problems. In a Rankine steam cycle, the removal of particulate matter from hot flue gas streams would permit the boiler to be designed with improved heat transfer surfaces, thereby greatly improving the performance and reducing the maintenance and operating cost of the boiler, and would also reduce the erosion and particulate loading on down-stream flue gas systems.

ESPs are used to separate particles from carrier gas by the application of an electrostatic charge. Conventional ESPs, which comprise electrically charged plates, operate up to about 300° C. and are not capable of capturing very fine and submicron particles. The effectiveness of charging a particle is inversely proportional to the square of the diameter of the particle. Due to large inter-electrode spacing, fine particles are not charged well in conventional ESPs and hence they can escape easily without being captured. Moreover, at temperatures above 300° C. the resistivity of particulates is greatly reduced, making conventional ESP technology less practical. Extremely large collection plates would have to be used; making the technology cumbersome and prohibitively expensive. Although there are some technologies to clean flue gas below 300° C., only a few technologies are commercially used to clean hot flue gases above 300° C.

Recently, ESPs have been developed in which the conventional charged plates are replaced by sieving screens, comprising a mesh in a plane perpendicular to the gaseous flow direction, the mesh having suitably sized apertures through which the flow passes towards a grounded collection area, typically a second screen. Such sieving screens can operate in a gaseous flow at temperatures above 300° C. For example, U.S. Pat. No. 6,878,192 to Pasic discloses an ESP primarily for use in a combustion flue gas stream, to replace conventional plates or baghouse filters. In the ESP disclosed in U.S. Pat. No. 6,878,192, the gaseous flow travels through a series of screens, in which single electrically charged screens are alternated with single grounded screens. It has been found that it is advantageous for each electrically charged screen to be in close proximity to the succeeding grounded screen, and that it is generally advantageous to alternate the electrically charged screens with the grounded screens. The reference does not address the complex issues of arrangement of the alternating polarity screens, nor issues relating to spatial relationships or cleaning, nor the additional issues which arise when substantially higher temperatures are involved than those contemplated by the reference, as discussed further below.

Conventionally, the electrically charged screens are provided with a negative charge, but it is known that positively charged screens can also be used with some beneficial effect. It is further known to enhance the effect of the charging screens by providing for a corona discharge by means of spikes provided to a first sieving screen, protruding into the gaseous flow, which results in an advantageous corona discharge, and hence enhanced particulate recovery.

Conventionally, the particulate matter accumulates on the grounded plates of ESPs, which are cleaned periodically at suitable intervals from the plates by an active process such as rapping or vibration, or by sweeping their surfaces by a mechanical means. Various methods of regulating the cleaning process for electrostatic precipitators using plates are known. For example, WO 2008/109592 suggests a method of controlling the order of rapping for the electrode plates of different sections. Similarly, for sieving screens, a rapping process can also be used. However, the timing intervals for these known processes in relation to the various screens may be quite arbitrary and consequently allow for excessive accumulation on some of the screens. Also, inappropriate rapping of two or more screens at the same time tends to result in particulate re-entrainment in the flue gas stream and carry through, which reduces the capture effectiveness of the precipitators.

It is therefore desirable to develop an electrostatic precipitator that does not suffer from these disadvantages noted above, and further disadvantages, which render the known ESPs less suitable or completely unsuitable for many applications.

It is particularly desirable to develop a method of using a sieving ESP to segregate particulate species, such as gaseous sulphur and nitrogen-containing species, alkali metals, halogens and trace heavy metals, contained in hot flue gas streams associated with combustion and gasification (either in air or oxygen-enriched environments), i.e. at temperatures above 300° C.

SUMMARY OF THE INVENTION

The subject of this invention is a process and device for removing particulate matters and other pollutants from hot gases by means of electrostatic sieving. It has now been found that a sieving ESP can be provided which can operate effectively in the higher temperature environments, up to 1200° C., of industrial processes where it is necessary to remove particulates before cooling the gaseous flow to a temperature at which conventional ESPs can be effectively used.

It has further been found that various manners of arrangement of the screens, as discussed below, can result in significantly more effective particulate removal including very fine and submicron particles.

Firstly, as noted above, it has previously been found to be advantageous to alternate the screens in relation to their respective polarities. It has now been found that it is possible to arrange the screens in groups, so that several screens of a first polarity are grouped together, followed in the flow direction by several screens of a second polarity which are also grouped together.

Secondly, it has been found that one limiting factor in relation to groupings of screens is that if the distance in the flow direction from a first screen in a group to a last screen in that group is too high, the effect of the corona discharge from the discharge screen group will be reduced in the later screens in the group.

It has now been found that this limiting factor can be addressed by preparing each group of screens as a compact unit, or cassette; and further, by providing spikes to one or more subsequent screens in such discharge cassette, resulting in further enhancement of the corona effect.

It has further been found that the important advantages of the grouping of screens can be achieved if the number of screens and the relative spacing between them is adjusted to take into account various factors relating to the particles and the stream in which they are carried. These factors include, but are not limited to, the particle loading, the size distribution, the types of particles, the relative proportions of the different types, their resistivity, based on the density of the material of the particles, the regularity or otherwise of the shape of individual particles, and the velocity of the stream carrying them. In addition, physical factors relating to the stream will also be relevant, for example the moisture level of the stream, which will affect the voltage required to charge the particles, so that in order to prevent arcing, more space is required between screens where the moisture level is higher. As these numerous factors will not be constant, and their relative importance will vary according to the operational environment of the screens, and fluctuations or other changes in the particulate stream in any single environment, it is particularly advantageous to provide a system of screens which can readily be adjusted as to their number and relative spacing both in setting up the system in a specific environment and in response to feedback from ongoing monitoring during active operation.

For the above reasons, and for optimal efficiency, it is further particularly advantageous if the screens can be installed so as to be adjustable individually or as a group, so as to reduce the spacing to the minimum which can be achieved without arcing between the screens. It is therefore important to provide for ongoing monitoring of the presence and location of arcing affecting the screens overall, and of the operation of individual screens.

Thirdly, it has been found that where negatively charged screens are used in combination with positively charged screens in an alternating arrangement, their combined effect creates an agglomeration of particulate matter, to provide an effective method at removing very fine and submicron particles from the flow. However, the spacing between the negatively charged screens and the positively charged screens will generally require adjustment according to the particular application and the operating temperature. At higher temperatures, it will generally be necessary to increase the relative spacing to avoid excessive arcing and allow for smooth operation of the electrostatic sieving process.

In relation to the cleaning of the screens, it has been found that the efficiency of the sieving ESP can be significantly enhanced by developing an algorithm to avoid re-entrainment and to prioritize the cleaning of individual screens, or groups of screens, based on information generated from ongoing monitoring of the pressure drop across individual and multiple screens. For the particular configuration of the sieving ESP, the cleaning process is always directed to the screen or group having the greatest need, and the process is implemented sequentially according to a continuously updated priority list, while simultaneously giving consideration to cleaning as few screens as possible at the same time and also to avoid two adjacent sets of screens being cleaned at the same time.

There are various known methods of cleaning, including the use of a sonic horn, to resonate the screens and thus effect removal of accumulated particles. It has now been found that important advantages can be obtained by providing for each group of screens to be subjected to an acoustic cleaning process, in which the frequency of the sound wave is adjustable as required for specific groups of particles. Sonic horns are one type of device suitable for the process, but others may also be suitable, but in each case the devices should be adjustable as to frequency and as to the intensity of the acoustic waves delivered to the screens, and can be configured to be activated in response to detected levels of pressure drop across the subject group of screens.

It has further been found that in some operating environments it can be particularly advantageous to provide multiple sieving ESPs to operate in parallel, and various configurations for multiple units, or multiple chambers within an individual unit, are discussed further below.

The apparatus and method of the invention are suitable for particle laden gaseous flows from a wide range of industrial processes, including but not limited to the following:

Atmospheric or pressurized combustion of fossil fuels where the means of combustion may employ a burner, combustor (slagging or non-slagging), boiler, furnace, or fluid bed under either air or oxy-firing mode, including direct or indirect firing or a combination thereof;

Atmospheric or pressurized gasification of fossil fuels where the means of gasification may employ one of the following accepted gasification processes:
Moving bed gasifier (dry or slagging)
Fluid bed gasifier (bubbling or circulating)
Entrained flow gasifier (wet or dry);

Atmospheric or pressurized means of generating high temperature gas streams that can use any combination of the above processes. One example of such combination would be a fluidized/gasification/slagging combustor; other combinations would also be possible.

In these industrial processes, the typical placement of the apparatus of the present invention would be downstream of the combustion or gasification process and upstream of such industrial components as: convective heat transfer sections, heat exchangers, gas separation membranes, gas turbines, steam turbines, other prime movers, pipelines, etc. However, the placement is not limited to such locations, and depending on the intended application the relative placement of the apparatus of the invention may be upstream or downstream of any particular process or component which is known to those familiar with the art.

In a broad embodiment, the invention therefore seeks to provide an electrostatic precipitator comprising (i) a housing having a central chamber, an inlet region comprising a flow inlet and an outlet region comprising a flow outlet, the housing being constructed and arranged to receive a gaseous flow in a gaseous flow direction between the flow inlet and the flow outlet;

(ii) a plurality of screens secured in sets within the central chamber to comprise at least one set of electrically chargeable first screens and at least one set of electrically grounded second screens wherein for each set of electrically chargeable first screens,
- (a) all the screens of the set are constructed and arranged to be provided in operation with an identical electrical charge selected from one of a positive charge and a negative charge;
- (b) the set is provided with a plurality of spikes constructed and arranged to protrude into the gaseous flow in a direction substantially opposed to the gaseous flow direction;

and for each set of electrically grounded second screens, all the screens are constructed and arranged to be electrically grounded in operation; and (iii) at least one screen cleaning means operatively connected to each set of screens.

Preferably, the electrostatic precipitator comprises at least one set of electrically chargeable first screens and at least one set of electrically grounded second screens, secured within the housing in alternating sequence in the gaseous flow direction so that each set of electrically grounded second screens follows a set of electrically chargeable first screens. More preferably, there are at least two sets of electrically chargeable first screens and at least two sets of electrically grounded second screens, secured within the housing in alternating sequence in the gaseous flow direction so that each set of electrically grounded second screens follows a set of electrically chargeable first screens.

The electrostatic precipitator can advantageously comprise at least two sets of electrically chargeable first screens, wherein at least one set is constructed and arranged to receive a negative electrical charge and at least one set is constructed and arranged to receive a positive electrical charge.

Preferably, the electrostatic precipitator comprises at least two sets of electrically chargeable first screens and at least two sets of electrically grounded second screens, secured within the housing in alternating sequence in the gaseous flow direction so that each set of electrically grounded second screens follows a set of electrically chargeable first screens. Preferably, in such configuration, one set of the electrically grounded second screens is secured between each set of negatively chargeable screens and each adjacent set of positively chargeable screens.

In one embodiment, the central chamber further comprises a refractory divider substantially along its length in the gaseous flow direction, the refractory divider defining a first subchamber and a second subchamber within the housing. In this embodiment, preferably the at least one set of first screens comprises at least one pair of sets of electrically chargeable first screens secured in substantially adjacent relationship; the at least one set of electrically grounded second screens comprises at least one pair of sets of electrically grounded second screens; and for each pair of sets of electrically chargeable first screens and for each pair of sets of electrically grounded second screens, the refractory divider provides a continuous division between each set of each pair. Further, the central chamber preferably comprises a flow control means to deliver the gaseous flow selectively to a flow path selected from through the first subchamber, through the second subchamber and concurrently through both the first and the second subchamber. Preferably, the flow control means is constructed and arranged to exclude the gaseous flow from a selected one of the subchambers during a cleaning operation to the selected subchamber, and the at least one screen cleaning means comprises a separate cleaning means for each of the subchambers.

In another embodiment, the at least one set of electrically chargeable first screens comprises at least one pair of sets of electrically chargeable first screens, each pair being secured in an aligned relationship in the gaseous flow direction, and for each pair the housing further comprises a refractory divider oriented substantially in the gaseous flow direction and secured between the two sets of the respective pair, such that in operation of the electrostatic precipitator the gaseous flow is divided between the sets of each pair and united as a single combined flow towards the next adjacent one of the sets of electrically grounded second screens. In this embodiment, preferably for each pair of sets of electrically chargeable first screens, a first set of the pair is constructed and arranged to receive a negative electrical charge and the second set of the pair is constructed and arranged to receive a positive electrical charge. Further, for each pair the refractory divider can be secured within a substantially horizontal plane or a substantially vertical plane within the housing.

Optionally, in each embodiment, proximate the inlet region the central chamber can comprise a grounded plate comprising a plurality of apertures providing an open flow-through area, preferably of at least 50% of the plate.

In a further embodiment, the invention seeks to provide an electrostatic precipitator comprising a housing having a plurality of central chambers, each having an inlet region comprising a flow inlet and an outlet region comprising a flow outlet, the housing being constructed and arranged to receive a gaseous flow in a gaseous flow direction between the respective flow inlet and the flow outlet, wherein each central chamber comprises (i) a plurality of screens secured in sets within the central chamber to comprise at least one set of electrically chargeable first screens and at least one set of electrically grounded second screens wherein for each set of electrically chargeable first screens,
- (a) all the screens of the set are constructed and arranged to be provided in operation with an identical electrical charge selected from one of a positive charge and a negative charge;
- (b) the set is provided with a plurality of spikes constructed and arranged to protrude into the gaseous flow in a direction substantially opposed to the gaseous flow direction;

and for each set of electrically grounded second screens, all the screens are constructed and arranged to be electrically grounded in operation; and (ii) at least one screen cleaning means operatively connected to each set of screens.

Preferably, the electrostatic precipitator further comprises a control means constructed and arranged to selectively activate and deactivate selected ones of the central chambers.

Preferably, the cleaning means comprises a pressure drop sensor constructed and arranged to monitor pressure across each set of screens; and a control means constructed and arranged to establish and continuously update a priority for sets of screens for cleaning, to activate and time the cleaning means in accordance with the established priority, and to delay cleaning for any of the sets of screens until completion of cleaning for each set of screens determined by the control means to have a higher priority. More preferably, the control means is also constructed and arranged to determine whether a plurality of sets of screens has an equal need for cleaning and to establish and continuously update a priority as between such plurality of sets of screens.

Where the electrostatic precipitator comprises a first and second subchamber, it preferably further comprises an isolation control means to selectively isolate a respective one of the first subchamber and the second subchamber for cleaning and to direct the flow to the other of the first subchamber and the second subchamber.

The cleaning means is preferably selected from a pneumatic rapping means, a pulse air means, an acoustic cleaning means, and combinations thereof, and preferably the cleaning means is an acoustic cleaning means, and comprises a sonic horn system.

Preferably, the housing further comprises at least one particulate collection hopper operatively connected to the central chamber; more preferably, each set of screens is separated from the hopper by at least one ceramic plate baffle, and one particulate collection hopper is provided to each set of screens.

Preferably, the electrostatic precipitator is constructed and arranged to receive a gaseous flow having a flow temperature between ambient temperature and 1200° C., more preferably between 300° C. and 1200° C., and most preferably between 300° C. and 1000° C.

Preferably, the electrostatic precipitator is constructed and arranged to have an operational pressure range between atmospheric pressure and 70 bar, more preferably between atmospheric pressure and 150 bar, and most preferably between atmospheric pressure and 250 bar.

In a further broad embodiment, the invention seeks to provide a method of removal of particulates from a gaseous flow in an electrostatic precipitator having a central chamber using a plurality of electrically chargeable screens and a plurality of electrically grounded screens, the method comprising the steps of (a) securing the screens in sets within the central chamber to comprise at least one set of electrically chargeable first screens and at least one set of electrically grounded second screens, at least a first screen in each set of electrically chargeable first screens being provided with a plurality of spikes constructed and arranged to protrude into the gaseous flow in a direction substantially opposed to a direction of the gaseous flow;

(b) providing an electrical charge to the electrically chargeable first screens such that for each set all the screens of the set have an identical electrical charge selected from one of a positive charge and a negative charge;

(c) passing the gaseous flow through the sets of screens within the central chamber to remove particulates to generate a cleaned gaseous flow;

(d) collecting the removed particulates;

(e) selectively cleaning the screens; and (f) delivering the cleaned gaseous flow to a flow receiver.

Preferably, step (a) comprises providing at least two sets of electrically chargeable first screens, and step (b) comprises providing at least one set of electrically chargeable first screens with a negative electrical charge and providing at least one set or electrically chargeable first screens with a positive electrical charge.

Preferably, step (a) comprises providing at least two sets of electrically chargeable first screens and at least two sets of electrically grounded second screens, secured within the central chamber in alternating sequence in the gaseous flow direction so that each set of electrically grounded second screens follows a set of electrically chargeable first screens.

Preferably, step (a) comprises providing at least two sets of electrically chargeable first screens as adjacent pairs of sets divided by a refractory divider; step (b) comprises providing a negative electrical charge to a first set of each pair and providing a positive electrical charge to a second set of each pair; and step (c) further comprises dividing the gaseous flow between the pairs of sets and uniting the gaseous flow between each pair of sets and the next adjacent set of electrically grounded second screens.

Preferably, step (e) comprises monitoring pressure across each set of screens to determine pressure differential values; establishing and continuously updating a priority for sets of screens for cleaning based on the determined values; and activating a cleaning means to clean the screens in accordance with the established priority, and delaying cleaning for any of the sets of screens until completion of cleaning for each set of screens determined by the control means to have a higher priority. Preferably, this determination further comprises determining whether a plurality of sets of screens has an equal need for cleaning and establishing and continuously updating a priority as between such plurality of sets of screens.

Preferably the cleaning in step (e) comprises cleaning selected ones of the screens by a cleaning process selected from pneumatic rapping, pulse air and acoustic cleaning and combinations thereof. More preferably, the cleaning is acoustic cleaning, and comprises selectively using a sonic horn system.

Preferably, the gaseous flow is from a combustion source selected from a burner, a slagging combustor, a non-slagging combustor, a boiler, a fluid bed, a furnace and a gasifier, each of which can be operational by direct firing, indirect firing and a combination thereof, pressurized or non-pressurized, air-fired and oxy-fired.

The cleaned gaseous flow can be delivered to any suitable flow receiver, which can include a convective heat transfer section, a heat exchanger, a gas separation membrane, a gas turbine, a steam turbine, a pipeline.

In summary, the potential benefits of integrating hot gas cleaning technology in fossil fuel energy conversion systems over conventional cold gas cleaning processes include: improved thermal efficiency and environmental performance, reduced capital and operating costs, and permitting the use of more advanced boiler configurations, combustors, and high efficiency gas turbines in a direct or indirect firing modes.

BRIEF DESCRIPTION OF THE DRAWINGS

The invention will now be described with reference to the drawings, in which.

DETAILED DESCRIPTION OF THE DRAWINGS

Figure 1:
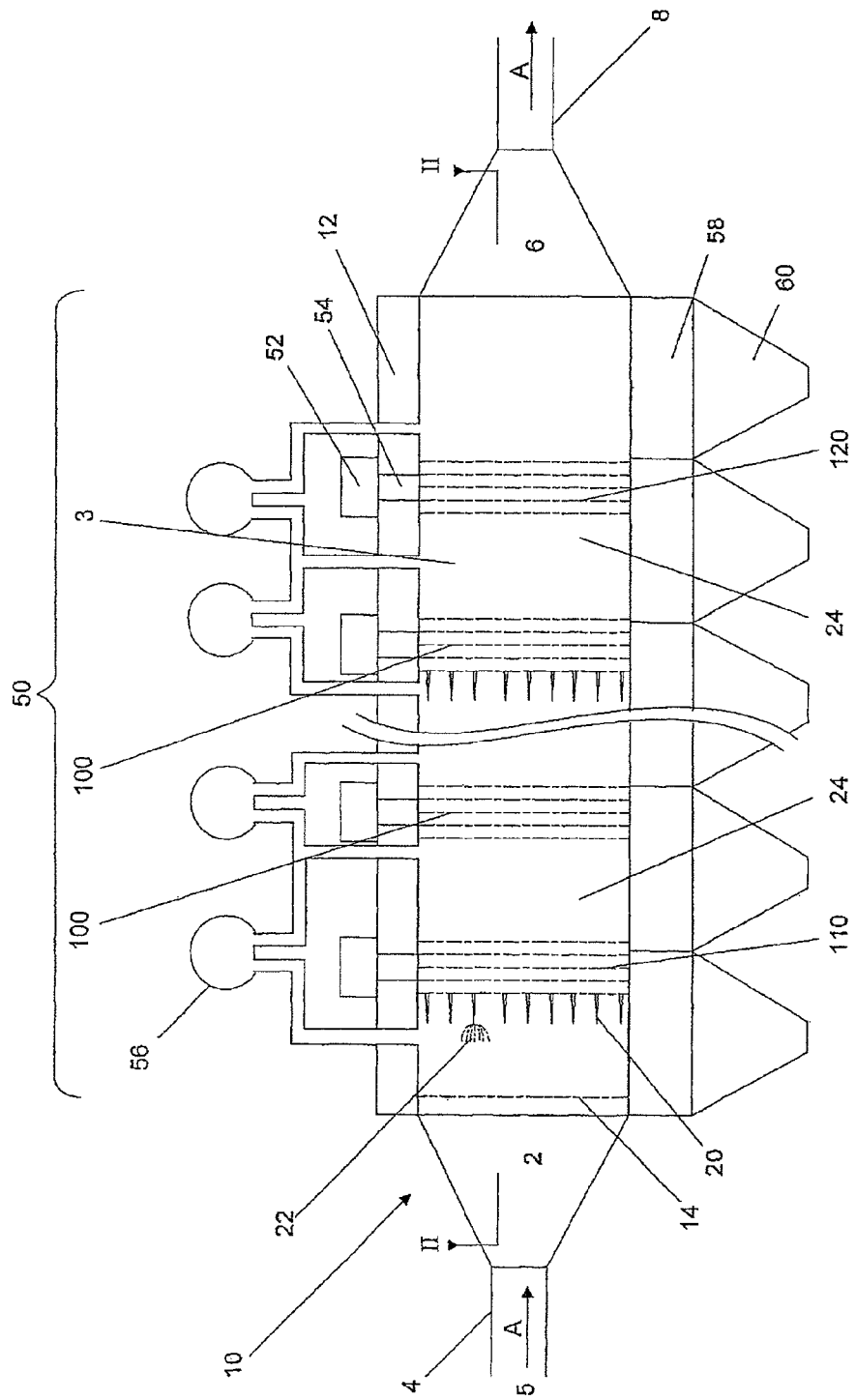
FIG. 1 is a sectional side view of a first embodiment of the invention.
Figure 2:
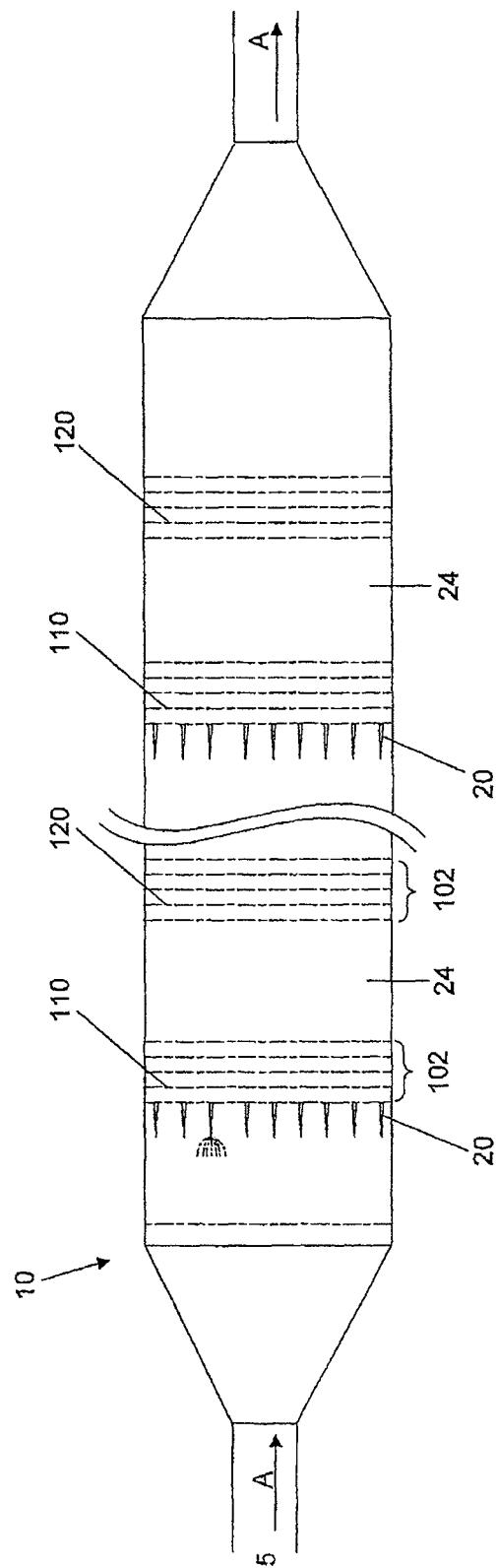
FIG. 2 is a sectional top view of the first embodiment of the invention, taken along the lines II-II in FIG. 1.

Referring first to FIGS. 1 and 2, an electrostatic precipitator 1 comprises a housing 10, having a central chamber 3, an inlet region 2 with a gaseous flow inlet 4 to receive a gaseous flow 5 in the direction of arrow A, and an outlet region 6 with a gaseous flow outlet 8. A grounded perforated plate 14 is provided at the entrance to the central chamber 3 from the inlet region 2.

Within the central chamber 3, a plurality of screens 100 are provided in groups, preferably as cassettes 102, comprising electrically chargeable groups 110 alternated with electrically grounded groups 120, the groups being spaced apart by spaces 24. At least a first screen of each electrically chargeable group 110 is provided with a plurality of spikes 20 in a suitable pattern across its entire surface facing the inlet region 2, to provide a corona discharge, shown in an exemplary manner in each of FIGS. 1 to 4 as corona discharge 22.

The number of groups of screens 110 and 120, and the number of individual screens in each of the groups 110 and 120 can be selected according to the intended end use, the nature of the gaseous flow 5, including the types and dimensions of the particulates expected to be carried in the gaseous flow 5. The number of screens in the electrically chargeable groups 110 and grounded groups 120 will be at least one, preferably between 1 and 20, and more preferably between 1 and 10.

The housing 10 is provided with screen cleaning or "rapping" means 50, preferably at the top of the central chamber 3. As shown in FIG. 1, a refractory cover 12 is provided over the central chamber 3. Over each group of screens 110, 120, pneumatic cylinders 52 or other similar devices (not shown) operate on impact cylinders 54, when activated by a suitable control means (not shown) in response to readings derived by pressure differential transmitter 56 from sensors (not shown) provided to the groups of screens 110, 120. As discussed further below, when activated, the respective impact cylinder 54 acts on a selected group of screens 110, 120 to remove particulates from that group, in a suitable manner, for example by striking or vibrating the appropriate screens.

Along the lower region of the central chamber 3, a plurality of hoppers 60 are provided, covered by baffles 58, to receive particulate materials from the groups of screens 110, 120 and the spaces 24.

Figure 3:
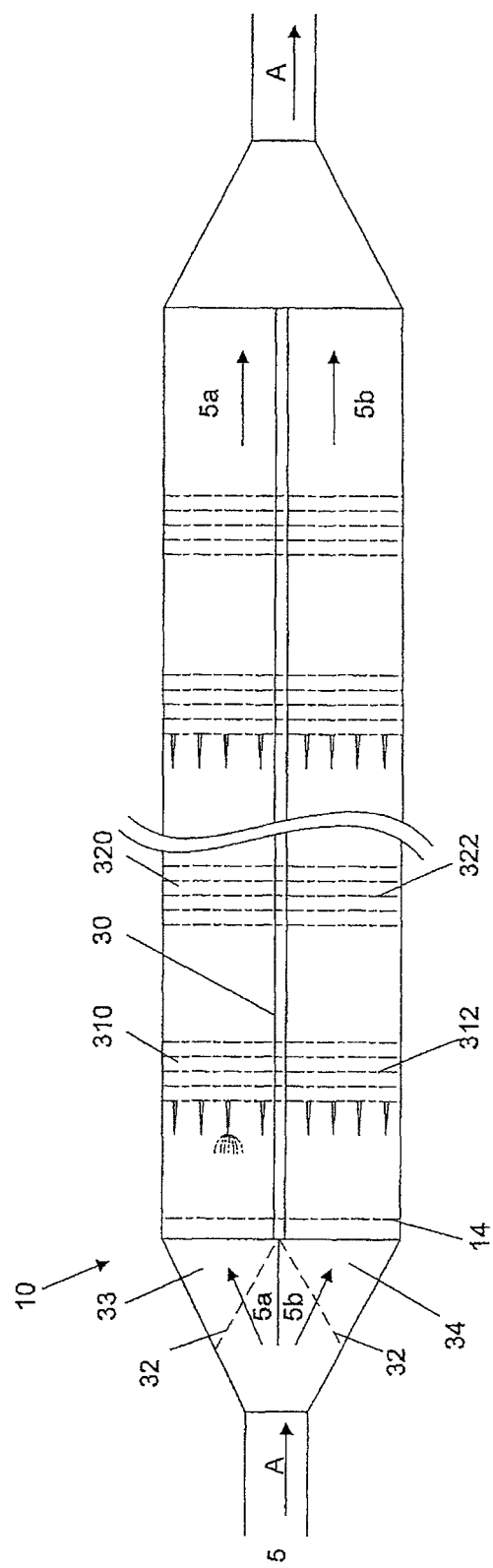
FIG. 3 is a sectional top view of a second embodiment of the invention from a location corresponding to that of FIG. 2.

Referring now to FIG. 3, in a second embodiment of the invention, the screens 100 can be provided as aligned pairs of groups, comprising electrically chargeable screens 310, 312, and grounded screens 320, 322, the members of each pair of screen groups being separated from each other by a refractory divider 30 provided within the central chamber 3 of the housing 10, dividing the central chamber 3 into two sub-chambers 33, 34, which are preferably equally sized. At the inlet region 2, a suitable gating means 32 is provided to divide and direct the gaseous flow 5 into the respective sub-chambers 33, 34. This has the beneficial-effect of enabling the cleaning of the two sub-chambers individually by means of pulse air, sonic horn, or by simultaneously rapping, striking, or vibrating all screens 110 and 120 to avoid re-entrainment.

Figure 4:
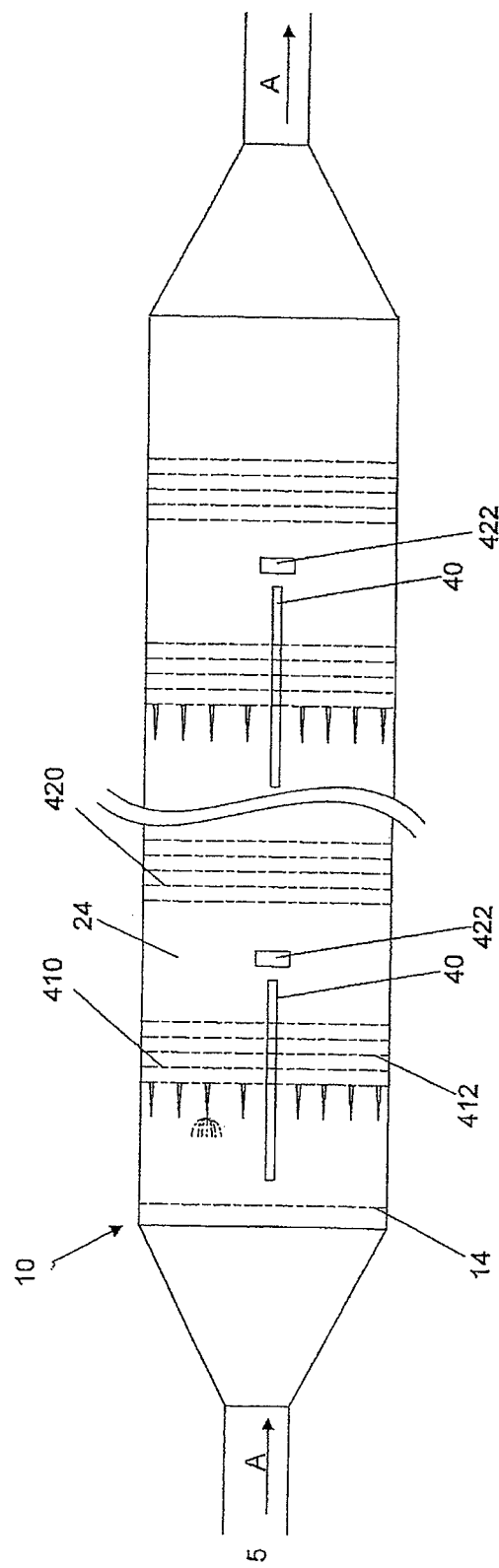
FIG. 4 is a sectional top view of a third embodiment of the invention from a location corresponding to that of FIGS. 2 and 3.

Referring now to FIG. 4, a further embodiment of the invention is shown, in which only some groups of the screens 100 are divided into aligned pairs of groups, the refractory dividing means being provided as a series of refractory dividers 40 between the pairs of electrically chargeable screens 410, 412, and the electrically grounded screens 420 are provided as groups of screens similar to groups 120 shown in FIG. 1. This arrangement allows for the provision of different polarity to the electrically chargeable screens 410 from that of the electrically chargeable screens 412, and for the gaseous flow 5 to be divided to pass through one of the groups of electrically chargeable screens 410, 412, but for the divided flow to reunite after passing into the common space 24 before the next group of electrically grounded screens 420. This has the beneficial effect that the opposite polarity of the charged particles results in an agglomeration of particulates, in agglomeration region 422. As the agglomeration increases, it will reach a volume at which it will fall and be collected below the space 24, by a suitable collection means such as hoppers 60 and baffles 58 as shown in FIG. 1.

In operation, the gaseous flow 5 from the industrial process is delivered through the inlet 4 to the inlet region 2, in the direction of arrow A, to pass through the screens 100 through the central chamber 3 to be delivered as a cleaned gaseous flow through the outlet region 6 to the outlet 8, to its intended end use. As noted above, the selection of the number of groups of the screens 100, and of the number of screens within specific groups, will depend on the intended end use and on the nature of the gaseous flow 5 and its constituents; and the appropriate size of the spaces 24 between the groups will depend on the configuration of the groups and the number of screens within the groups. However, as noted above, preferably the groups of screens are provided as cassettes. In turn, the configuration of the rapping means 50 will depend on the configuration and layout of the groups of screens 100.

Figure 5:
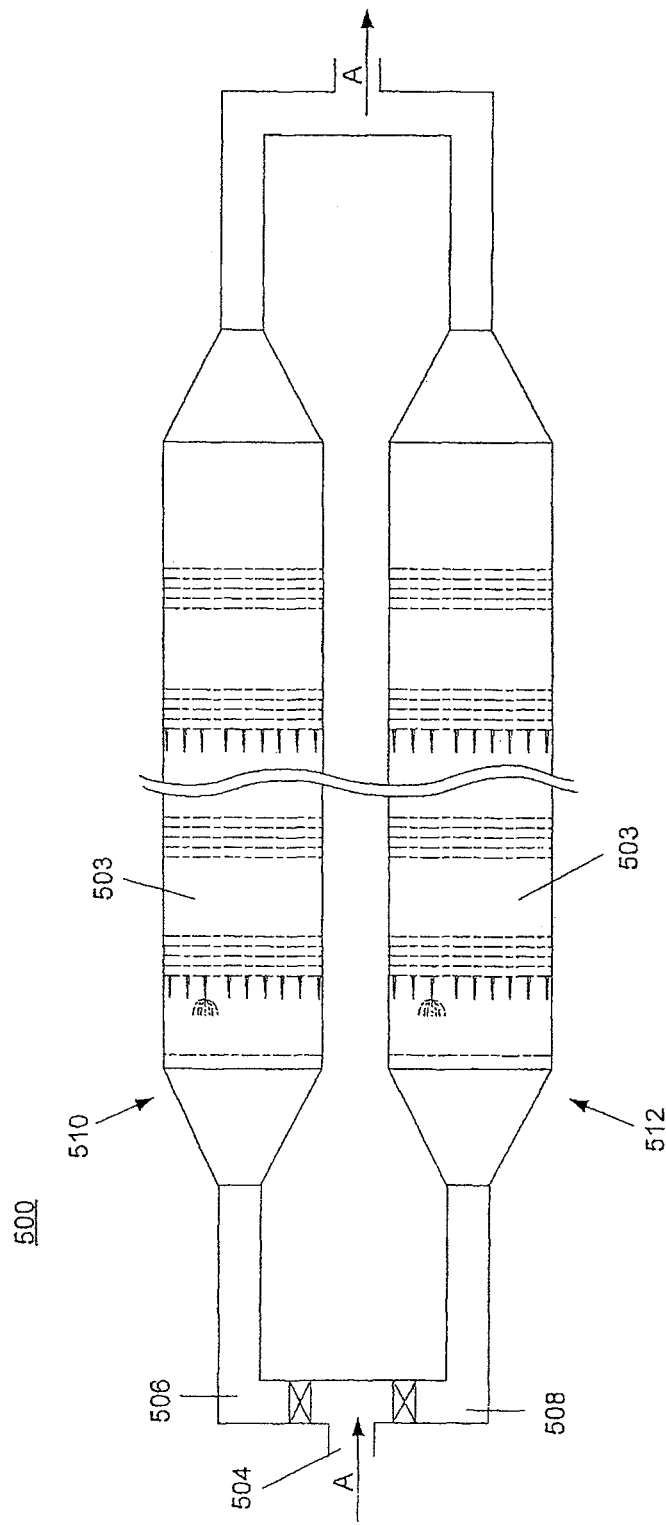
FIG. 5 is a sectional top view of a fourth embodiment of the invention from a location corresponding to that of FIGS. 2 and 3.

Referring now to FIG. 5, an alternative embodiment of the invention is shown in cross-sectional top view, from a similar location to that of FIGS. 2 and 3. In this embodiment, ESP 500 comprises two separate housings 510, 512, each comprising a central chamber 503 constructed in accordance with the invention, for example to correspond with any of the embodiments described above. At inlet region 502, gaseous flow inlet 504 is divided into separate flow channels 506, 508, respectively providing a flow path into housings 510, 512, and thence into central chambers 503. At outlet region 514, flow channels 516, 518 from central chambers 503 combine as gaseous flow outlet 520. At inlet region 502, control means (not shown) are provided to regulate the flow between the flow channels 506, 508, for efficiency depending on factors such as the flow volume, or for cleaning purposes. This embodiment is shown as comprising two housings 510, 512, but any number of housings can be combined into a multiple unit system, depending on the requirements of the particular application. By selective operation of the appropriate control means, if conditions require, the flow to one chamber 503 can be completely stopped for cleaning or other repair, or at times of low flow volume, without any need to stop the overall flow to the (or any) other chamber 503, providing the advantage of allowing for continuity of operation.

For operation of the rapping means 50 in the embodiments described above, the physical manner of cleaning the screens can be selected from any suitable known means, such as pneumatic cylinders 52 acting on impact cylinders 54. However, the control means (not shown) is constructed to prioritize activation in relation to specific groups of screens, based on a continuous process of ranking of necessity for activation, determined by the monitored pressure differential values. Preferably, the control means operates in a manner to ensure that firstly, the group of screens most in need of rapping will be cleaned, and secondly, at the same time, where for example two or more groups of screens are in equal need of cleaning, one will be prioritized over the other or others, so that rapping will not commence for a subsequent group of screens until completed for a first group.

Figure 6:
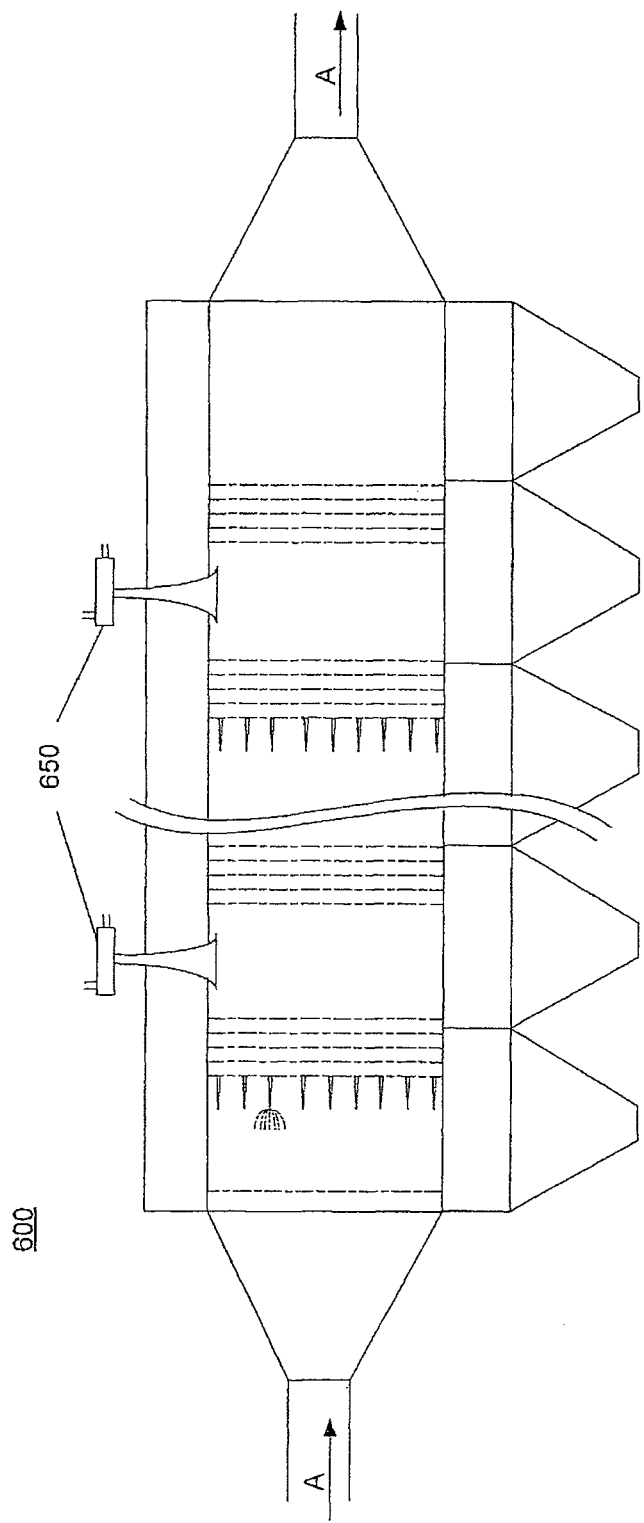
FIG. 6 is a sectional side view of a fifth embodiment of the invention from a location corresponding to that of FIG. 1.
Figure 7:
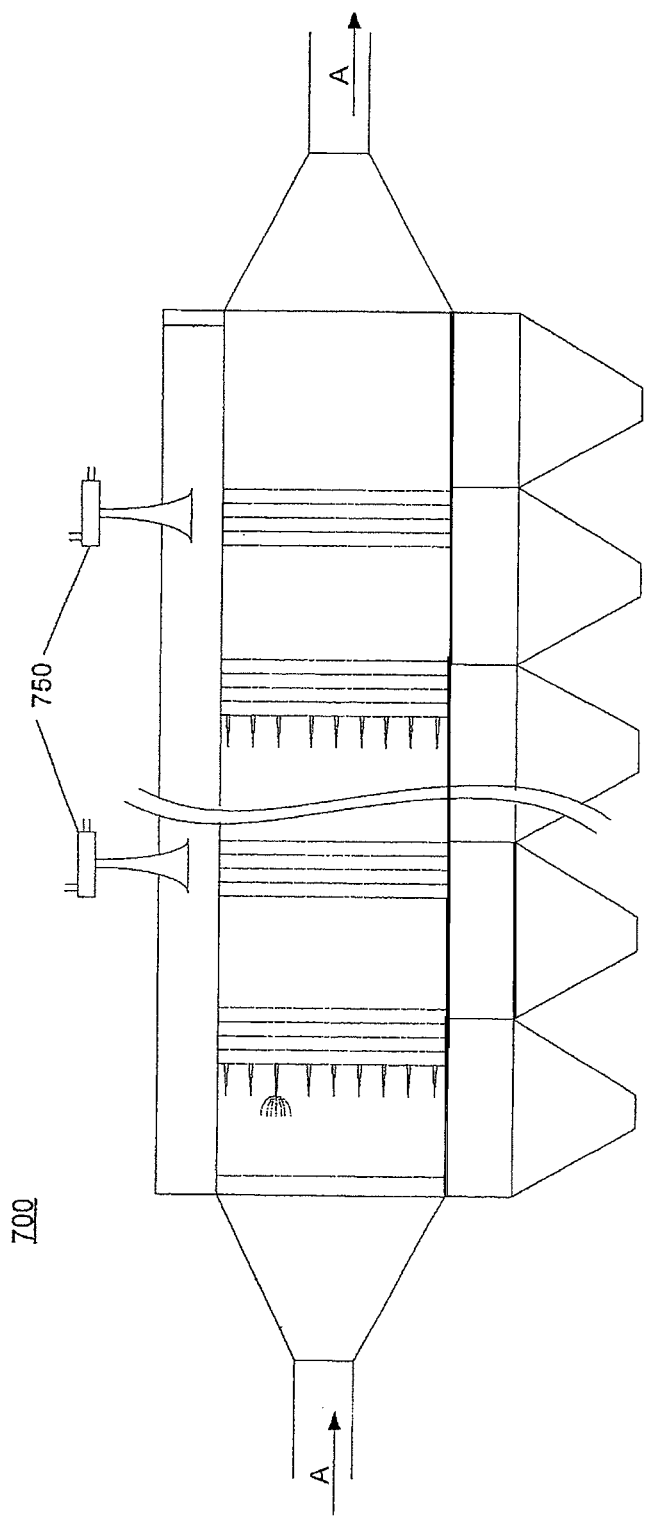
FIG. 7 is a sectional side view of a sixth embodiment of the invention from a location corresponding to that of FIG. 1.

Referring now to FIGS. 6 and 7, two further exemplary embodiments are shown, as sectional side views of electrostatic precipitators 600, 700 respectively, in each case shown from a similar location to that of FIG. 1. These figures illustrate further options for the cleaning means for the screens, comprising an acoustic cleaning system, shown here as sonic horns 650 (FIG. 6) located between sets of screens, and 750 (FIG. 7), located directly over specific sets of screens. In each of these embodiments, the horns are provided in such manner that each screen will be within the appropriate range to receive sound waves from at least one horn, so that by selective activation of the horns, the screens can be cleaned as and when appropriate, with the prioritization as discussed above.

The invention claimed is:

1. An electrostatic precipitator comprising
   (i) a housing having a central chamber, an inlet region comprising a flow inlet and an outlet region comprising a flow outlet, the housing being constructed and arranged to receive a gaseous flow in a gaseous flow direction between the flow inlet and the flow outlet;
   (ii) a plurality of screens secured in sets within the central chamber to comprise at least one set of electrically chargeable first screens and at least one set of electrically grounded second screens wherein
   each set of electrically chargeable first screens,
      (a) all the screens of the set are constructed and arranged to be provided in operation with an identical electrical charge selected from one of a positive charge and a negative charge;
      (b) the set is provided with a plurality of spikes constructed and arranged to protrude into the gaseous flow in a direction substantially opposed to the gaseous flow direction;
   and for each set of electrically grounded second screens, all the screens are constructed and arranged to be electrically grounded in operation; and
   (iii) at least one screen cleaning means operatively connected to each set of screens.

2. An electrostatic precipitator according to claim 1, comprising at least one set of electrically chargeable first screens and at least one set of electrically grounded second screens, secured within the housing in alternating sequence in the gaseous flow direction so that each set of electrically grounded second screens follows a set of electrically chargeable first screens.

3. An electrostatic precipitator according to claim 1, comprising at least two sets of electrically chargeable first screens, wherein at least one set is constructed and arranged to receive a negative electrical charge and at least one set is constructed and arranged to receive a positive electrical charge.

4. An electrostatic precipitator according to claim 3, wherein one set of the electrically grounded second screens is secured between each set of negatively chargeable screens and each adjacent set of positively chargeable screens.

5. An electrostatic precipitator according to claim 1, comprising at least two sets of electrically chargeable first screens and at least two sets of electrically grounded second screens, secured within the housing in alternating sequence in the gaseous flow direction so that each set of electrically grounded second screens follows a set of electrically chargeable first screens.

6. An electrostatic precipitator according to claim 1, wherein the central chamber further comprises a refractory divider substantially along its length in the gaseous flow direction, the refractory divider defining a first subchamber and a second subchamber within the housing.

7. An electrostatic precipitator according to claim 6, wherein
   (i) the at least one set of first screens comprises at least one pair of sets of electrically chargeable first screens secured in substantially adjacent relationship;
   (ii) the at least one set of electrically grounded second screens comprises at least one pair of sets of electrically grounded second screens secured in substantially adjacent relationship; and
   (iii) for each pair of sets of electrically chargeable first screens and for each pair of sets of electrically grounded second screens, the refractory divider provides a continuous division between each set of each pair.

8. An electrostatic precipitator according to claim 7, wherein the central chamber comprises a flow control means to deliver the gaseous flow selectively to a flow path selected from through the first subchamber, through the second subchamber and concurrently through both the first and the second subchamber.

9. An electrostatic precipitator according to claim 8, wherein the flow control means is constructed and arranged to exclude the gaseous flow from a selected one of the subchambers during a cleaning operation to the selected subchamber.

10. An electrostatic precipitator according to claim 9, wherein the at least one screen cleaning means comprises a separate cleaning means for each of the subchambers.

11. An electrostatic precipitator according to claim 1, wherein the at least one set of electrically chargeable first screens comprises at least one pair of sets of electrically chargeable first screens, each pair being secured in an aligned relationship in the gaseous flow direction, and wherein for each pair the housing further comprises a refractory divider oriented substantially in the gaseous flow direction and secured between the two sets of the respective pair, such that in operation of the electrostatic precipitator the gaseous flow is divided between the sets of each pair and united as a single combined flow towards the next adjacent one of the sets of electrically grounded second screens.

12. An electrostatic precipitator according to claim 11, wherein for each pair of sets of electrically chargeable first screens, a first set of the pair is constructed and arranged to receive a negative electrical charge and the second set of the pair is constructed and arranged to receive a positive electrical charge.

13. An electrostatic precipitator according to claim 12, wherein for each pair the refractory divider is secured within a substantially horizontal plane within the housing.

14. An electrostatic precipitator according to claim 12, wherein for each pair the refractory divider is secured within a substantially vertical plane within the housing.

15. An electrostatic precipitator according to claim 1, wherein proximate the inlet region the central chamber comprises a grounded plate comprising a plurality of apertures providing an open flow-through area of at least 50% of the plate.

16. An electrostatic precipitator according to claim 1, wherein the cleaning means further comprises
   (i) a pressure drop sensor constructed and arranged to monitor pressure across each set of screens; and
   (ii) a control means constructed and arranged to establish and continuously update a priority for sets of screens for cleaning, to activate and time the cleaning means in accordance with the established priority, and to delay cleaning for any of the sets of screens until completion of cleaning for each set of screens determined by the control means to have a higher priority.

17. An electrostatic precipitator according to claim 6, wherein the cleaning means further comprises
   (i) a pressure drop sensor constructed and arranged to monitor pressure across each set of screens;
   (ii) a control means constructed and arranged to monitor the screens of the first subchamber and the second subchamber, and to establish and continuously update a priority for cleaning the sets of screens as between the sets of the first subchamber and the sets of the second subchamber, and to activate and time the cleaning means in accordance with the established priority, and to delay cleaning for any of the sets of screens until completion of cleaning for each set of screens determined by the control means to have a higher priority; and
   (iii) an isolation control means to selectively isolate a respective one of the first subchamber and the second subchamber for cleaning and to direct the flow to the other of the first subchamber and the second subchamber.

18. An electrostatic precipitator according to claim 16, wherein the control means is constructed and arranged to determine whether a plurality of sets of screens has an equal need for cleaning and to establish and continuously update a priority as between such plurality of sets of screens.

19. An electrostatic precipitator according to claim 16, wherein the cleaning means is selected from a pneumatic rapping means, a pulse air means, an acoustic cleaning means, and combinations thereof.

20. An electrostatic precipitator according to claim 19, wherein the cleaning means is an acoustic cleaning means, and comprises a sonic horn system.

21. An electrostatic precipitator according to claim 1, wherein the housing further comprises at least one particulate collection hopper operatively connected to the central chamber.

22. An electrostatic precipitator according to claim 21, wherein each set of screens is separated from the hopper by at least one ceramic plate baffle.

23. An electrostatic precipitator according to claim 21, wherein one particulate collection hopper is provided to each set of screens.

24. An electrostatic precipitator according to claim 1, constructed and arranged to receive a gaseous flow having a flow temperature between ambient temperature and 1200° C.

25. An electrostatic precipitator according to claim 24, wherein the flow temperature is between 300° C. and 1200° C.

26. An electrostatic precipitator according to claim 24, wherein the flow temperature is between 300° C. and 1000° C.

27. An electrostatic precipitator according to claim 1, constructed and arranged to have an operational pressure range between atmospheric pressure and 70 bar.

28. An electrostatic precipitator according to claim 27, wherein the operational pressure range is between atmospheric pressure and 150 bar.

29. An electrostatic precipitator according to claim 27, wherein the operational pressure range is between atmospheric pressure and 250 bar.

30. An electrostatic precipitator comprising a plurality of housings, each housing having a central chamber, an inlet region comprising a flow inlet and an outlet region comprising a flow outlet, the housing being constructed and arranged to receive a gaseous flow in a gaseous flow direction between the respective flow inlet and the flow outlet, wherein each central chamber comprises
   (i) a plurality of screens secured in sets within each central chamber to comprise at least one set of electrically chargeable first screens and at least one set of electrically grounded second screens wherein
   each set of electrically chargeable first screens is a group comprising at least two adjacently secured screens, wherein
      (a) all the screens of the set are constructed and arranged to be provided in operation with an identical electrical charge selected from one of a positive charge and a negative charge; and
      (b) the set is provided with a plurality of spikes constructed and arranged to protrude into the gaseous flow in a direction substantially opposed to the gaseous flow direction;
   and each set of electrically grounded second screens is a group comprising at least two adjacently secured screens, wherein all the screens are constructed and arranged to be electrically grounded in operation; and
   (ii) at least one screen cleaning means operatively connected to each set of screens.

31. An electrostatic precipitator according to claim 30, further comprising a control means constructed and arranged to selectively activate and deactivate selected ones of the central chambers.

32. An electrostatic precipitator according to claim 30, wherein the cleaning means further comprises
   (i) a pressure drop sensor constructed and arranged to monitor pressure across each set of screens; and
   (ii) a control means constructed and arranged to establish and continuously update a priority for sets of screens for cleaning, to activate and time the cleaning means in accordance with the established priority, and to delay cleaning for any of the sets of screens until completion of cleaning for each set of screens determined by the control means to have a higher priority.

33. An electrostatic precipitator according to claim 32, wherein the control means is constructed and arranged to determine whether a plurality of sets of screens has an equal need for cleaning and to establish and continuously update a priority as between such plurality of sets of screens.

34. An electrostatic precipitator according to claim 32, wherein the cleaning means is selected from a pneumatic rapping means, a pulse air means, an acoustic cleaning means, and combinations thereof.

35. An electrostatic precipitator according to claim 34, wherein the cleaning means is an acoustic cleaning means, and comprises a sonic horn system.

36. A method of removal of particulates from a gaseous flow in an electrostatic precipitator having a central chamber using a plurality of electrically chargeable screens and a plurality of electrically grounded screens, the method comprising the steps of
   (a) securing the screens in sets within the central chamber to comprise at least one set of electrically chargeable first screens, each set being a group comprising at least two adjacently secured screens and at least one set of electrically grounded second screens, each set being a group comprising at least two adjacently secured screens, at least a first screen in each set of electrically chargeable first screens being provided with a plurality of spikes constructed and arranged to protrude into the gaseous flow in a direction substantially opposed to a direction of the gaseous flow;

(b) providing an electrical charge to the electrically chargeable first screens such that for each set all the screens of the set have an identical electrical charge selected from one of a positive charge and a negative charge;

(c) passing the gaseous flow through the sets of screens within the central chamber to remove particulates to generate a cleaned gaseous flow;

(d) collecting the removed particulates;

(e) selectively cleaning the screens; and (f) delivering the cleaned gaseous flow to a flow receiver.

37. A method according to claim 36, wherein step (a) comprises providing at least two sets of electrically chargeable first screens, and step (b) comprises providing at least one set of electrically chargeable first screens with a negative electrical charge and providing at least one set of electrically chargeable first screens with a positive electrical charge.

38. A method according to claim 36, wherein step (a) comprises providing at least two sets of electrically chargeable first screens and at least two sets of electrically grounded second screens, secured within the central chamber in alternating sequence in the gaseous flow direction so that each set of electrically grounded second screens follows a set of electrically chargeable first screens.

39. A method according to claim 36, wherein step (a) comprises providing at least two sets of electrically chargeable first screens as adjacent pairs of sets divided by a refractory divider; step (b) comprises providing a negative electrical charge to a first set of each pair and providing a positive electrical charge to a second set of each pair; and step (c) further comprises dividing the gaseous flow between the pairs of sets and uniting the gaseous flow between each pair of sets and the next adjacent set of electrically grounded second screens.

40. A method according to claim 36, wherein step (e) comprises (e.i) monitoring pressure across each set of screens to determine pressure differential values;

(e.ii) establishing and continuously updating a priority for sets of screens for cleaning based on values determined in step (e.i); and (e.iii) activating a cleaning means to clean the screens in accordance with the established priority, and delaying cleaning for any of the sets of screens until completion of cleaning for each set of screens determined by the control means to have a higher priority.

41. A method according to claim 40, wherein step (e.iii) further comprises determining whether a plurality of sets of screens has an equal need for cleaning and establishing and continuously updating a priority as between such plurality of sets of screens.

42. A method according to claim 36, wherein the cleaning in step (e) comprises cleaning selected ones of the screens by a cleaning process selected from pneumatic rapping, pulse air and acoustic cleaning.

43. A method according to claim 42, wherein the cleaning in step (e) is acoustic cleaning, and comprises selectively using a sonic horn system.

44. A method according to claim 36, wherein the gaseous flow is from a combustion source selected from a burner, a slagging combustor, a non-slagging combustor, a boiler, a fluid bed, a furnace and a gasifier.

45. A method according to claim 44, wherein the combustion source is selected from direct firing, indirect firing and a combination thereof.

46. A method according to claim 44, wherein the combustion source is selected from pressurized and non-pressurized.

47. A method according to claim 44, wherein the combustion source is selected from air-fired and oxy-fired.

48. A method according to claim 36, wherein in step (f) the flow receiver is selected from a convective heat transfer section, a heat exchanger, a gas separation membrane, a gas turbine, a steam turbine and a pipeline.

* * * * *